United States Patent [19]

Donahue

[11] Patent Number: 5,034,747
[45] Date of Patent: Jul. 23, 1991

[54] DETACHABLE RADAR UNIT FOR A HELMET

[76] Inventor: Christopher A. Donahue, 2109 Orchard, Alton, Ill. 62002

[21] Appl. No.: 335,895

[22] Filed: Apr. 10, 1989

[51] Int. Cl.⁵ .............................................. G01S 7/40
[52] U.S. Cl. ......................................... 342/20; 2/410; 455/344; 455/346
[58] Field of Search ................... 342/20; 455/226, 228, 455/227, 344, 345, 346; 2/410, 422; 362/72, 106

[56] References Cited

U.S. PATENT DOCUMENTS

| | | | |
|---|---|---|---|
| 3,088,002 | 4/1963 | Heisig | 2/6 X |
| 3,786,519 | 1/1974 | Aileo | 2/6 |
| 3,898,747 | 8/1975 | Marshall | 434/22 |
| 4,131,889 | 12/1978 | Gray | 342/114 |
| 4,394,831 | 7/1983 | Egli et al. | 89/41 EA |
| 4,524,461 | 6/1985 | Kostanty | 455/79 |
| 4,613,989 | 9/1986 | Fende et al. | 455/351 |
| 4,631,542 | 12/1986 | Grimsley | 342/20 |
| 4,648,131 | 3/1987 | Kawaguchi et al. | 455/606 |
| 4,673,936 | 6/1987 | Kotoh | 342/51 |
| 4,688,037 | 8/1987 | Krieg | 342/448 X |
| 4,719,462 | 1/1988 | Hawkins | 342/28 |
| 4,725,840 | 2/1988 | Orazietti | 342/20 |
| 4,750,215 | 6/1988 | Biggs | 455/226 |
| 4,760,497 | 7/1988 | Roston | 361/427 |
| 4,866,229 | 9/1989 | Scharfenberg | 340/705 X |
| 4,884,137 | 11/1989 | Hanson et al. | 455/617 |
| 4,920,412 | 4/1990 | Gerdt et al. | 356/5 X |

Primary Examiner—Thomas H. Tarcza
Assistant Examiner—John B. Sotomayor
Attorney, Agent, or Firm—Don W. Weber

[57] ABSTRACT

A detachable radar unit for a motorcycle unit is presented. An outer shell is permanently attached to the side of a motorcycle helmet. A radar sensing unit may be inserted into the shell, making electrical contact with a microphone and light panel attached to the helmet. The radar sensing unit may also be detached from the helmet and attached to a car or boat by using separate shells permanently mounted on the car or boat. A special quick disconnect plug in the unit's power supply cord is provided which quickly and easily disconnects the helmet from the motorcycle should the need arise.

1 Claim, 5 Drawing Sheets

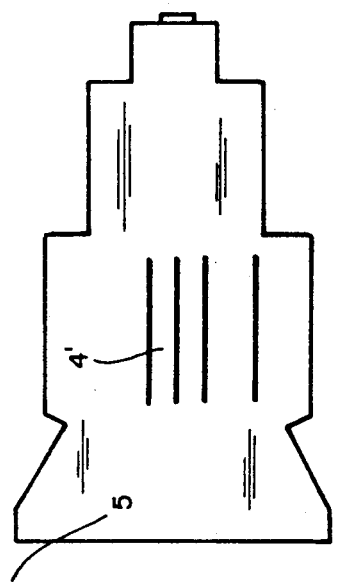
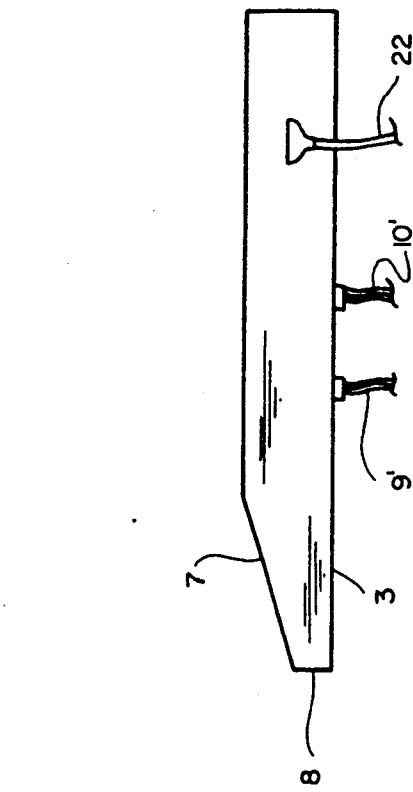
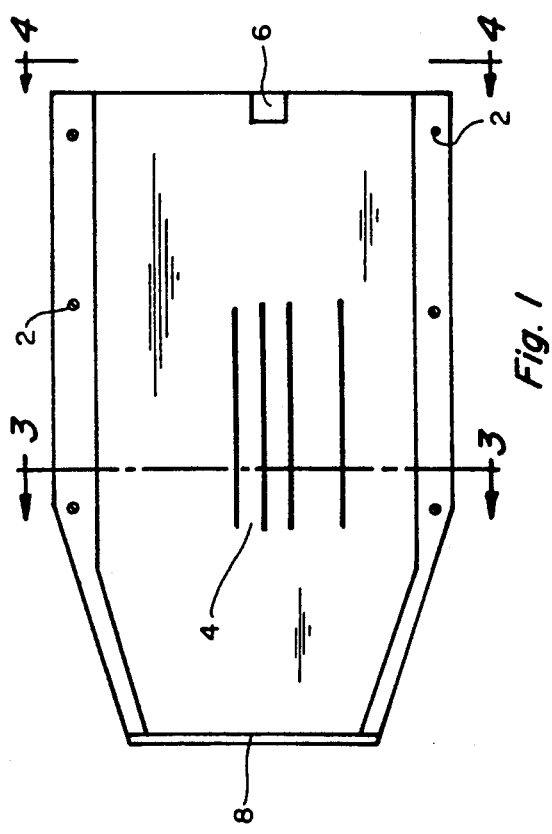
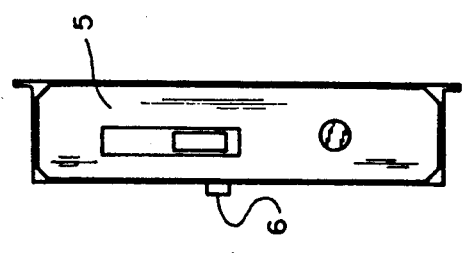
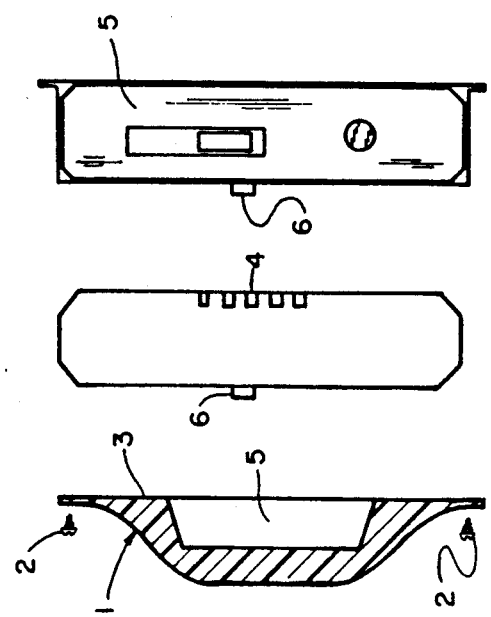
Fig. 1  Fig. 2  Fig. 3  Fig. 4  Fig. 5  Fig. 6

DETACHABLE RADAR UNIT FOR A HELMET

BACKGROUND OF THE INVENTION

This invention relates to the field of radar detection and more particularly to radar detection for motorcycle riders. It has been known in the prior art to use radar devices to detect the presence of radar. It has also been known to permanently attach a radar unit inside a motorcycle helmet so as to enable the rider of a motorcycle to detect the presence of radar. However, the prior art radar detecting helmet encounters a number of difficulties in the construction and use of such a helmet. Attaching the radar unit to the interior of a normal motorcycle safety helmet requires removal of important safety cushioning material inside the helmet. The removal of this material and the replacement of it with hard, non-absorbing material creates a severe safety hazard. Additionally, the prior art radar detecting helmet requires the unit to be sold as an integral whole, rather than allowing the attachment of a lightweight radar device to a rider's own helmet.

Radar detection units for use in detecting radar are well known in the art, and are particularly set out in a number of patents. These U.S. patents include: 4,131,889 (1978); Fende, 4,613,989 (1986); Grimsley, 4,631,542 (1986); Biggs, 4,750,215 (1988). Applicant's unique device is directed to the means of attaching such a radar unit to the outside of a motorcycle helmet and to providing certain safety devices and mechanisms unique to the motorcycle radar detection unit field.

While a number of solutions have been advanced for placing communications equipment inside a helmet, none of the solutions have solved the problem necessarily encountered by reducing the amount of safety protection provided by a helmet in the replacement of safety cushioning material with the radar, audio and visual equipment required to make the electronic helmet function.

It is an object of this invention to provide a detachable radar unit for a motorcycle helmet such that only a very small and insignificant amount of interior safety material need be removed. It is further an object of this invention to provide a radar unit that may be attached to an existing motorcycle helmet or, alternatively, to be quickly adaptable to be used in a car or boat.

It is a further object of this invention to provide a quick disconnect safety device for unplugging the radar unit from the power source should an accident occur. Further, the improved radar detecting helmet provided herein may be attached to a rider's existing helmet thus making the instant radar detecting helmet more economical and practical. Other and further objects of this invention will become obvious upon reading the following Specification.

BRIEF DESCRIPTION OF THE INVENTION

This invention comprises a shell which is permanently attached to the outside of a normal motorcycle helmet. The shell has mechanical connections built therein to receive and hold in place a portable and detachable radar sensing unit. The shell also has electrical connections so that the radar unit may detect a radar signal and send out an audio and visual detection signal. The audio signal is observed by means of a light panel which is attached to the top of the helmet within view of the rider. A small microphone is also provided so that an audio signal may be heard by the rider when the radar unit senses the operation of radar. The visual and audible alerting means are connected to the radar sensing device by means of small wires. The radar sensing unit is connected to the power source of the motorcycle by means of a power cord. The helmet end of the power cord is connected to the clothing of the rider by means of a safety clip. Just below the safety clip, a quick disconnect plug in the power cord line allows the power cord to become quickly and safely disconnected should the need arise. The entire unit may be removed and used in an automobile or boat by simply attaching the unit to an attaching bracket located in the automobile or boat.

BRIEF DESCRIPTION OF THE DRAWINGS

FIG. 1 is a side view of the adaptable outer shell of the unit.

FIG. 2 is a top view of the outer shell showing the leads for the speaker and light panel.

FIG. 3 is a cross-sectional view of the outer shell along lines 3—3 in FIG. 1.

FIG. 4 is an end view of the empty protective shell taken along line 4—4 of FIG. 1.

FIG. 5 is identical to FIG. 4 except that the radar sensing unit is inserted into the shell.

FIG. 6 is a schematic representation of the radar sensing circuitry slightly removed from the outer shell.

DETAILED DESCRIPTION OF THE PREFERRED EMBODIMENT

Figure 7:
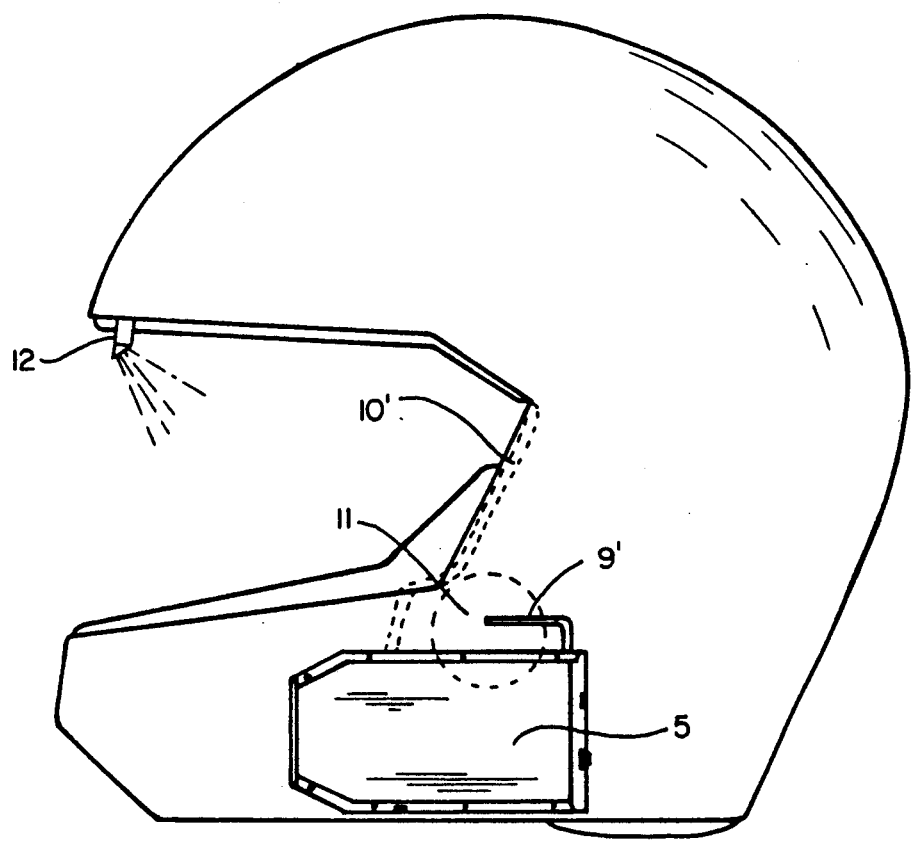
FIG. 7 is a side view of a motorcycle helmet showing the position of the outer shell, speaker and light panel.

A normal motorcycle helmet is composed of a hard outer shell and a soft inner lining. The inner lining is padded and provides the safety protection for the wearer of the helmet. The device herein is designed to enable a person to quickly and easily detachably mount a radar sensing unit to the outside of the helmet and still leave the structural integrity of the helmet and the cushioning material inside the helmet intact. The outer shell 1 is attached to the outside of the helmet by means of a number of self-tapping screws 2 and by means of a self-adhesive backing for the protective shell shown generally at 3. The unit is attached by first positioning the unit on the side of the helmet (as best shown in drawing FIGS. 7 and 10) by means of the self-tapping screws and self-adhesive backing for the protective shell. The outer protective shell 1 has a number of contacts 4 which are located so as to electrically connect the helmet light panel and microphone to the radar sensing unit circuitry 4' located on the radar sensing unit 5. The radar sensing unit 5 is mechanically attached to the inside of the protective shell by sliding the unit into the shell and latching it by means of the latch 6. This latch 6 (as shown in FIGS. 4 and 5) is a standard latch type mechanism well known in the art.

As shown on the top view of the outer shell in FIG. 2, the front portion of the outer shell is sloped downwardly and toward the shell so as to create an aerodynamic curve 7 to reduce wind resistance. This radar sensor lens 8 is located at the front end of the outer shell.

Figure 8:
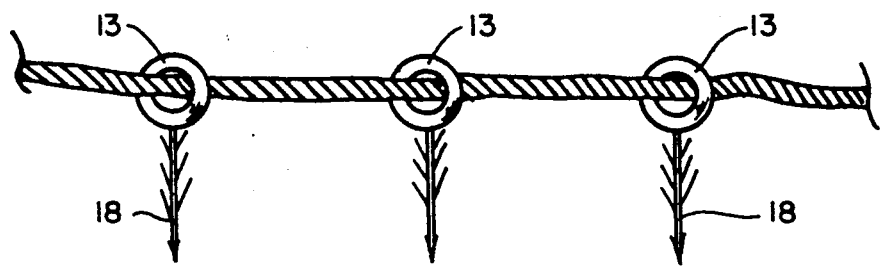
FIG. 8 is a schematic view showing how the internal wires are connected to the inside of the helmet.
Figure 24:
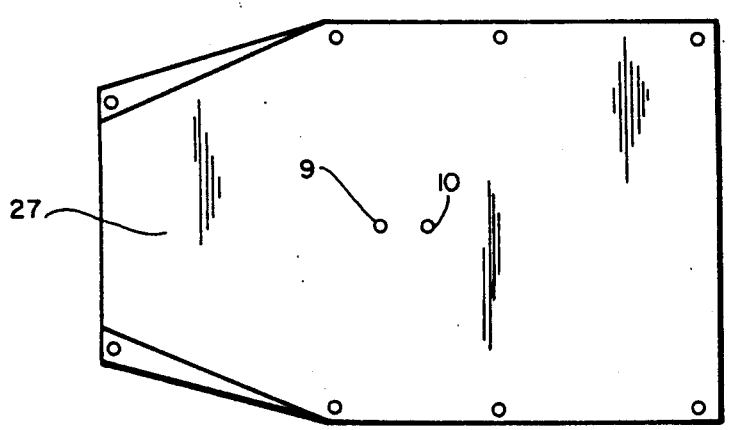
FIG. 24 shows the schematic template used for attaching the protective shell.
Figure 22:
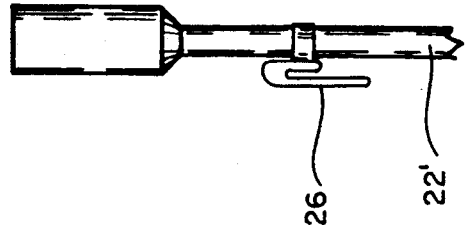
FIG. 22 is a detail showing the lower portion of the power supply cord.
Figure 23:
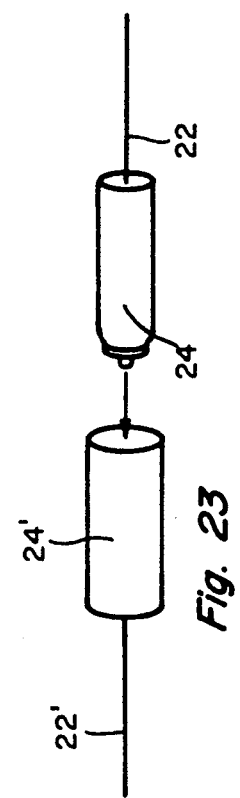
FIG. 23 is a schematic drawing showing the male and female quick disconnect safety device.

As best shown in FIG. 24, two small holes 9 and 10 are drilled through the shell of the helmet so that small lead wires may connect the radar sensing unit to the microphone 11 through the audio line 9' and to the light panel 12 through the visual line 10'. The small audio and visual lines 9' and 10' are affixed to the inside of the helmet by means of small wire guides 13. The wire guides are essentially circular loops with male prongs attached to the loop as shown in FIG. 8. These male prongs have barbs which are made to insert into the soft material on the inside of the helmet. The barbs then hold the loops in place, which in turn holds the audio and visual lines in a fixed configuration. The eyelets of the wire guides are coated with rubber so as to cause a minimum amount of discomfort to the wearer of the fully radar equipped motorcycle helmet. The exact route of the audio and visual lines is left to the discretion of the person installing the sensor device. The preferred embodiment and suggested configuration of the radar sensing unit, microphone, and light panel is as shown in FIG. 7.

Figure 9:
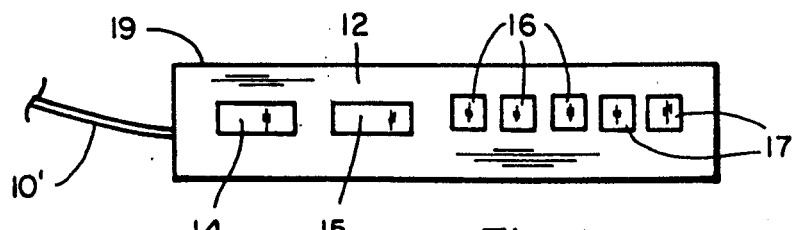
FIG. 9 shows the configurations of the lights on the light panel.

The light panel 12 is shown and described in FIG. 9. The light panel has a number of lights which are color coded to indicate different positions or alerts. As shown on FIG. 9, the light panel has two power indicator lights on the left hand side of the panel. A first green light 14 shows that the radar sensing unit is powered. A second blue light 15 indicates a "city" radar mode used for city radar detection applications. To the right of the power light indicators are a number of intensity lights which range from amber 16 to red 17. These lights give the user of the helmet a visual indication of the operation of the radar sensing unit. The visual electrical connection 10' between the light panel 12 and the radar sensing unit 5 is also shown on FIG. 9.

Figure 10:
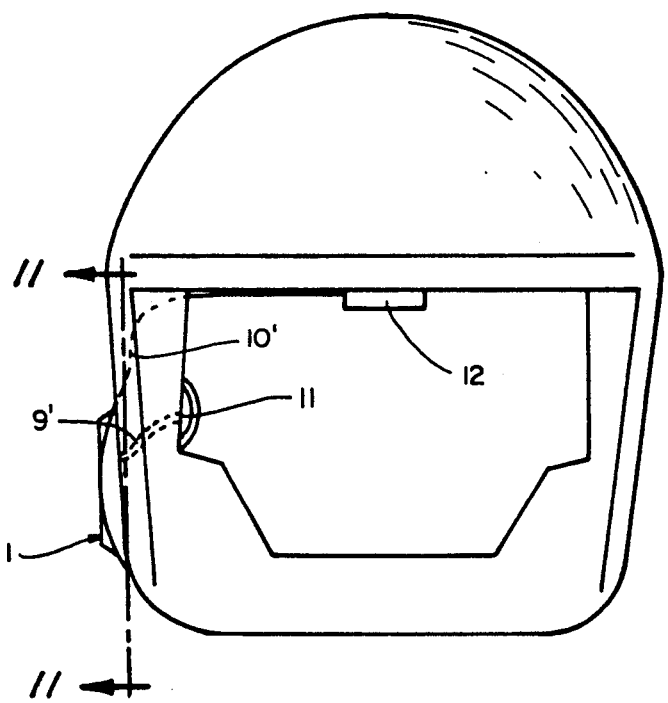
FIG. 10 is a front view of the motorcycle helmet showing the light panel, microphone and radar sensing unit attached.
Figure 11:
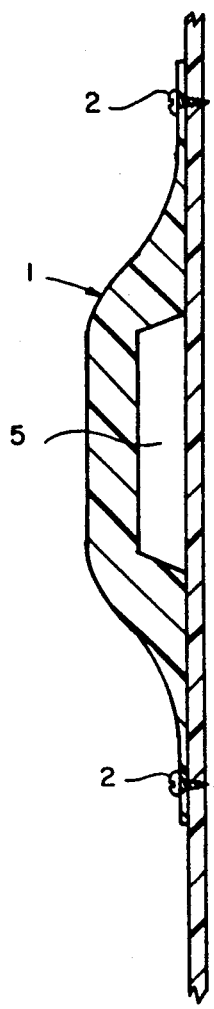
FIG. 11 is a cross-sectional view of the helmet and outer shell taken along lines 11—11 of FIG. 10.
Figure 13:
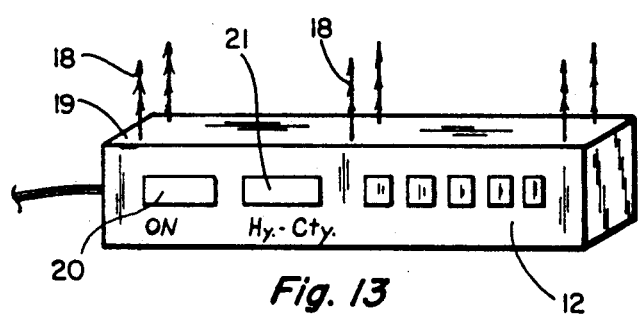
FIG. 13 is a schematic representation of the method of connection of the light panel.
Figure 14:
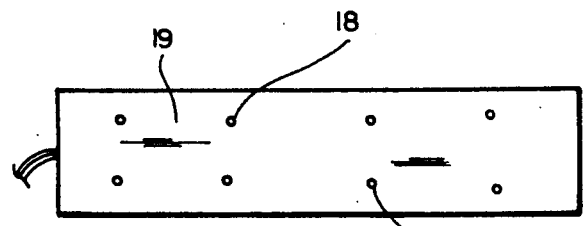
FIG. 14 is a top view of the light panel shown prior to attachment to the helmet.

The light panel is attached to the upper part of the helmet, as shown on FIG. 10, by means of barbed pins 18 which are attached to the light panel 12 as shown in FIG. 13. The upper part of the light panel also has an adhesive peel-off back 19. This adhesive peel-off back provides added attachment capability for the light panel. A top view of the light panel (as shown in FIG. 14) describes the configuration of the barbed pins 18 and the adhesive peel-off surface 19.

Figure 12:
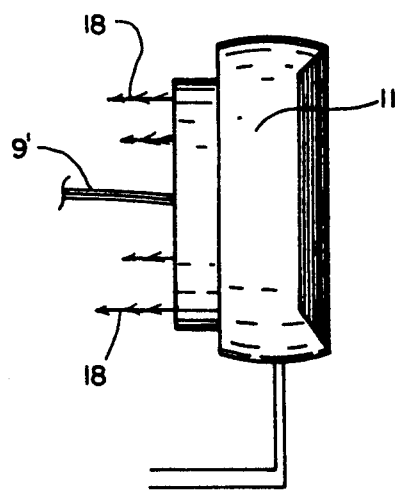
FIG. 12 is a schematic view showing the method of connection of the internal microphone.

The microphone is attached to the inside of the helmet in a manner similar to that of attachment of the light panel. As shown in FIG. 12, the microphone 11 also has a number of barbed pins 18 attached to the rear portion of the microphone. The speaker is a foam covered miniature speaker which is easily installed by the customer according to the particular requirements of the user of the radar sensing helmet device. The microphone 11 is connected to the radar sensing unit 5 by means of the audio line 9'. The microphone should generally be placed on the outside of the inner liner of the helmet as best shown in FIG. 10.

Figure 17:
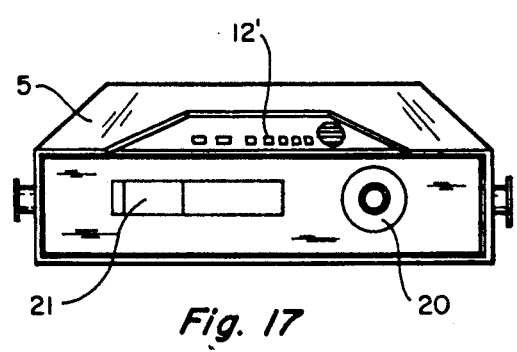
FIG. 17 is a perspective view showing the radar sensing unit inside the outer shell detaching device.

As noted above, the radar sensing unit 5 is completely detachable from the outer shell 1. As shown in FIG. 17, the radar sensing unit 5 may operate independently of the motorcycle helmet.

The radar sensing device used in this invention has two main switches for its operation. An "on-off"/volume switch 20 is used to switch the radar device "on" or "off," and to control the volume of the audible signal. A "city" switch 21 is also present on the device. This "city" switch is used when driving in essentially urban environments. (It is well known in the radar detection art that different sensitivities of a radar sensing unit are required for urban as opposed to rural travel.) When the "city" mode is in use, such a mode will be displayed as a blue light 15 on the light panel.

Figure 15:
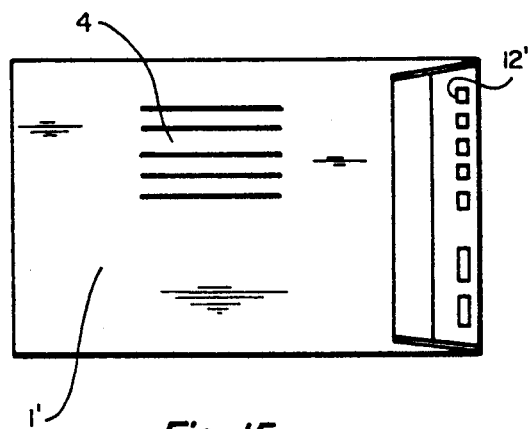
FIG. 15 is a side view of the universal radar detection unit before insertion into the outer shell.
Figure 16:
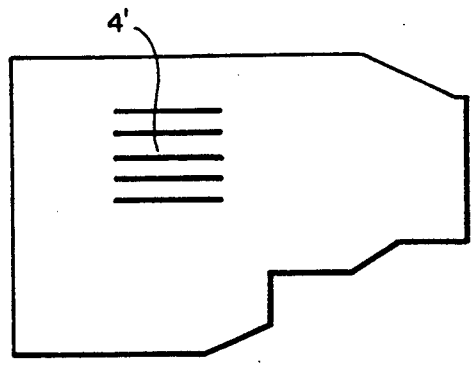
FIG. 16 shows the schematic circuitry connections for the radar sensing unit.
Figure 18:
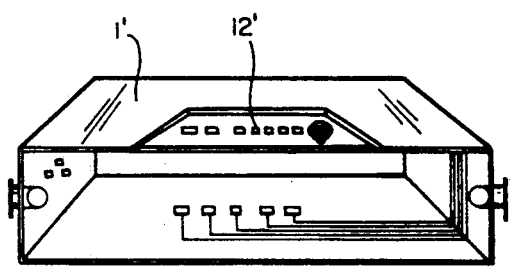
FIG. 18 shows the outer shell which is used for attaching the radar sensing unit to an automobile or boat.

When used in a car or boat, the radar sensing unit will have a light panel 12' attached to the top of the unit as shown in FIG. 17. An automobile or boat outer shell 1' (FIG. 15) may be attached to an automobile or boat in any convenient location. Once attached, this outer shell will receive the radar sensing unit 5 which may be completely separated from the radar sensing helmet. As shown in FIGS. 15 and 16, the radar sensing unit 5 has circuitry which adapts so that the radar sensing unit may be inserted into the automobile or boat shell 1' and the appropriate electrical connections 4 and 4' may be made. Once attached, the radar sensing unit 5 is mounted on the automobile or boat as shown in FIG. 17. The visor clip 12' is permanently mounted to the automobile or boat shell 1' and remains with that shell.

Figure 19:
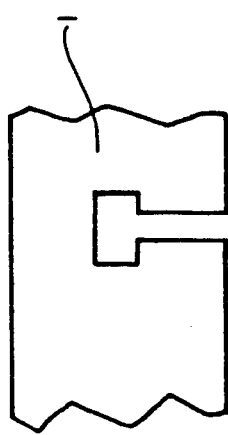
FIG. 19 is a detail showing the attachment of the power cord to the helmet.
Figure 20:
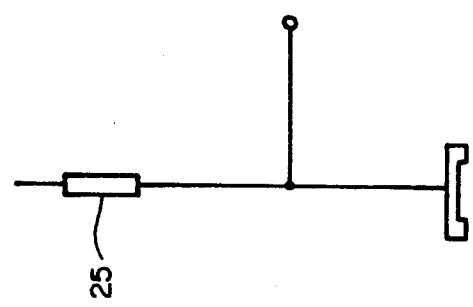
FIG. 20 is a detail showing the alligator clip and male disconnect of the power wire.

The power supply to the radar sensing unit for the motorcycle helmet comprises a quickly detachable cord. The upper end of the power supply cord 22 is detachably mounted to the outer shell 1 as shown in FIG. 19. The power cord is necessarily more than several feet long and must be attached to the motorcycle itself. Attaching a motorcycle helmet to a motorcycle might cause a great deal of danger if a means were not devised to quickly detach the cord from the motorcycle in the event of an accident or the need to dismount the motorcycle quickly. To solve that problem a unique alligator clip 23 and male-female quick disconnect 24 are provided. The upper end 22 of the power cord connects to the lower end 22' of the power cord through a quick disconnect separation plug 24. An upper male connector 24 is attached to the upper end of the power cord 22. A lower end female connector 24' is also attached to the lower end 22' of the power cord. The quick disconnect plug is made so that slight pressure on the plug will cause the male-female plug to quickly and safely disconnect. This special feature greatly enhances the safety of the motorcycle radar sensing unit. In order to insure that there is a positive disconnect of the power cord should the need arise, a unique alligator clip is provided on the upper end of the power cord 22 near the male power cord connector 24. As best shown on FIG. 20, the alligator clip 23 is attached to the rider's clothing at any convenient position, such as the collar or upper pocket of the rider. The lower cord 22' with its female disconnect plug 24', is then connected to the power source of the motorcycle in any convenient manner. This alligator clip/quick disconnect plug greatly improves the safety of the motorcycle rider and hence the desirability of this particular unit.

Figure 21:
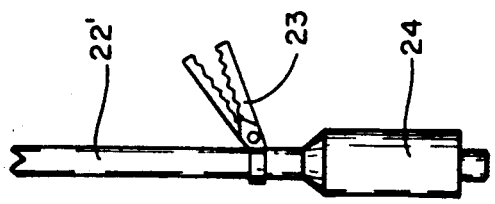
FIG. 21 is a schematic drawing of the power supply to the radar sensing unit.

As shown schematically in FIG. 21 a fuse link 25 is used to protect the integrity of the power cord supplied to the motorcycle helmet. The negative end of the power cord grounds to the motorcycle and the positive end of the power cord plugs directly into the fuse box on the motorcycle itself. A stationary clip 26 is attached to the lower end 22' of the power cord so that the lower end may be conveniently clipped on to the front edge of the motorcycle seat.

The installation of this radar sensing unit and shell is simply made. The installation is accomplished by means of an installation schematic 27 as shown in FIG. 24. In order to install the outer shell 1, one simply places the schematic 27 on the side of the motorcycle helmet in the approximate position shown in FIGS. 7 and 10. The schematic template 27 then indicates where the holes need to be drilled for the self-tapping screws 2 and for the audio and visual lines 9 and 10. Preferably, the outer shell is approximately five inches (5") long by four inches (4") in height and is attached, as previously noted, by means of self-tapping screws and a self-adhesive backing.

The device as herein above described may be used interchangeably between the owner's motorcycle helmet and automobile or boat. The most costly portion of the radar sensing device, the sensing unit 5, may thus be used in a variety of applications, greatly increasing the cost efficiency of purchasing such a unit. Due to the fact that the device is designed to be installed by the owner/buyer, the unit may be installed on the owner's previously purchased helmet. This reduces the necessity for purchasing a new helmet. It is believed that the ability to use one's own motorcycle helmet and to interchangeably use the radar sensing unit on other vehicles greatly enhances the desirability and functionality of the instant device. Additionally, the quick disconnect plug and method of attachment greatly enhances the safety of using a device such as the one presented here.

An optional twelve volt battery pack could also be installed on the helmet so as to eliminate the need for the power cord. This optional battery pack would be installed by using a second outer bracket and connecting the battery pack to the sensor device by means of a separate power cord.

It is to be appreciated that the description of the preferred embodiment as set out herein is meant as a means of illustration only and not as a limitation.

Having thus fully described and illustrated my new invention, I claim:

1. A detachable radar sensing device for a standard motorcycle helmet, comprising:
   (1) an aerodynamically curved outer shell including attaching means comprising small self-tapping screws and a self-adhesive backing so that the structural integrity of said helmet is maintained wherein said shell may be attached to said helmet;
   (2) a radar sensing unit mechanically and electrically detachably connected inside said shell, wherein said electrical connecting means comprises corresponding contacts on said shell and said radar sensing unit such that insertion of said radar sensing unit into said shell establishes the electrical contact;
   (3) a light panel attached to said helmet and electrically connected to said radar sensing unit by a wire, wherein said wire is secured to said helmet by means of wire guides having barbed ends;
   (4) a microphone attached to said helmet and electrically connected to said radar unit by a wire, wherein said wire is secured to said helmet by means of wire guides having barbed ends; and
   (5) a quickly detachable power cord, said power cord having an upper end attached to said outer shell and is releasably attached to the wearer of said helmet by means of an alligator clip and a lower end connected to the power source of a motorcycle, further comprising a male-female quick disconnect plug to releasably connect said upper and lower power cord ends;
   wherein ia radar unit may be detachably installed on a standard motorcycle helmet and whereby said radar unit is quickly and safely disconnected in case of an accident.

* * * * *